United States Patent
O'Neill et al.

(10) Patent No.: US 6,775,218 B1
(45) Date of Patent: Aug. 10, 2004

(54) HIGH DENSITY DATA WRITE STRATEGY

(75) Inventors: Michael P. O'Neill, Richmond, CA (US); Terrence L. Wong, San Francisco, CA (US); David K. Warland, Davis, CA (US); Kunjithapatham Balasubramanian, Emeryville, CA (US); Matthew C. Bashaw, Palo Alto, CA (US); Timothy Learmonth, Berkeley, CA (US); Gregory A. McDermott, Oakland, CA (US); Raghuram Narayan, Alameda, CA (US); Judith C. Powelson, Alameda, CA (US); Ting Zhou, El Cerrito, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/373,916

(22) Filed: Aug. 12, 1999

(51) Int. Cl.[7] .................................................. G11B 7/00
(52) U.S. Cl. ................... 369/59.11; 369/13.27; 369/59.12; 369/116

(58) Field of Search ............................ 369/13.27, 13.26, 369/47.1, 47.53, 47.55, 47.49, 116, 124.15, 124.14, 59.1, 53.1, 53.36

(56) References Cited

U.S. PATENT DOCUMENTS

| 5,631,887 A | 5/1997 | Hurst ........................... 369/59 |
| 5,644,556 A | 7/1997 | Oikawa ........................ 369/13 |
| 5,737,301 A | 4/1998 | Miyamoto et al. ........... 369/116 |
| 6,545,954 B2 * | 4/2003 | Sukeda et al. ............. 369/47.53 |

* cited by examiner

*Primary Examiner*—Muhammad Edun
(74) *Attorney, Agent, or Firm*—Christopher P. Maiorana PC

(57) ABSTRACT

A system and method are disclosed for recording information on a phase change medium is disclosed. The method includes irradiating a region of the phase change medium with a first dose of laser energy. A first portion of the region is irradiated with a second dose of laser energy in a manner that causes the first portion of the region irradiated with the second dose of laser energy to be in a different state than a second portion of the region that is not irradiated by the second dose of laser energy.

21 Claims, 18 Drawing Sheets

US 6,775,218 B1

HIGH DENSITY DATA WRITE STRATEGY

FIELD OF THE INVENTION

The present invention relates generally to optical data storage. More specifically, writing high-density multi-level or binary data to an optical disk made of material whose state may be changed upon radiation by a laser beam is disclosed. A region of material is modified using a laser and the controlled formation of the material state and its distribution within the region is described.

BACKGROUND OF THE INVENTION

Information may be stored on an optical disc by creating regions or "marks" having a different reflectivity than the surrounding surface of the disc. In an optical phase change disc, such regions are formed by irradiating the surface of the disc with a writing laser that causes a region to be warmed and melted or partially melted. As the region cools, the region may change to a crystalline or amorphous state or some combination of crystalline and amorphous states. When a reading laser is incident on such a region, the reflected light can be measured and the state of the region can be determined. The state of the region represents stored data. Different levels of reflectivity may represent different data levels.

FIG. 1A is a cross section of a typical optical phase change disc 100. Optical phase change disc 100 includes a substrate 102. A first dielectric layer 104 is deposited on the substrate. A recording layer 106, which is composed of a phase change material, is deposited on top of dielectric layer 104. A second dielectric layer 108 is deposited over recording layer 106. A reflective layer 110 is deposited over dielectric layer 108. Finally, a protective resin layer 112 is deposited over reflective layer 100. The layers described above are provided as an example only and that the techniques described herein are applicable to other types of phase change discs as well as other optical discs that utilize different recording mechanisms. U.S. Pat. Nos. 5,136,573 and 5,144,615, (the '573 and '615 patents, respectively) issued to Kobayashi, which are herein incorporated by reference for all purposes, describe techniques for multilevel recording using optical phase change discs. Kobayashi describes lowering the reflectivity of an initially amorphous region by forming crystalline material and that more crystalline material may be formed as the writing laser power is increased. Kobayashi also discloses an overwrite technique that forms a crystalline region using a low level biasing energy and increases the reflectivity by forming a crystalline region at certain spots using energy pulses that create amorphous regions.

FIG. 1B illustrates the biasing signal disclosed in the Kobayashi patent as well as the different pulse signal levels for creating different amounts of amorphous material. Kobayashi mentions that either power or pulse width may be used to vary the amount of laser energy deposited on a region, but does not disclose a specific scheme for varying pulse width. FIG. 1C illustrates the claimed results with reflectivity increasing as the amount of amorphous material formed increases.

Kobayashi discloses different types of written spots. In the '573 patent, a record spot that is smaller than the size of a reading laser beam is disclosed that increases in size as the energy deposited by the writing laser increases. FIG. 1D illustrates the varying size of the written region. In the '615 patent, varying length spots that encode information with both their lengths and varying levels of reflectivity that result from different degrees of crystallization are disclosed. FIG. 1E illustrates different length marks having different reflectivities.

Kobayashi does not describe a technique for handling spots that are close enough to each other that writing one spot affects the writing of other spots. In order to further increase the density of recorded marks on phase change discs, it would be desirable to develop techniques for placing variable reflectivity marks closer together. Furthermore, it would be useful if more reliable techniques could be developed for varying the reflectivity of a region. A more reliable overwrite process for phase change discs is also needed.

Conventional thinking is that the minimum size of recorded data marks in optical systems (including systems that use a phase change media or other optical recording media) is limited to the size of the reading laser beam and the writing laser beam. While optical techniques have been developed for reducing the laser beam size of both reading and writing lasers, it would be useful if even smaller marks could be made on the disc so that the density of information stored on the disc could be increased.

SUMMARY OF THE INVENTION

A method of writing marks on a phase change material is described. Marks are written in a manner such that their size can be less than the size of the focused spot of a writing laser. By forming marks smaller than the reading laser beam, the reflectivity of a region of material can be varied with great precision. The reflectivity of a region is controlled by varying the relative amount of material in crystalline and amorphous phases. The total amount of crystalline and amorphous material in a region is controlled by creating marks of various sizes or shapes. The mark size and shape is controlled by placing the leading and trailing edges of laser pulses such that the timing of a second laser pulse further modifies the region of material irradiated by a first pulse. Additional modification of the mark size and shape results from controlling the time course of the laser power during the pulse. Existing marks may be directly overwritten by irradiating previously recorded regions with the methods described below.

In one embodiment, a method of recording information on an optical disc is disclosed. The method includes irradiating a region of the optical disc with a first dose of laser energy. A first portion of the region is irradiated with a second dose of laser energy in a manner that causes the first portion of the region irradiated with the second dose of laser energy to be in a different state than a second portion of the region that is not irradiated by the second dose of laser energy.

In another embodiment, a write strategy processor is configured to generate control signals for writing data to an optical disc comprising a processor configured to specify a first laser pulse for irradiating a region of the optical disc with a first dose of laser energy and a second laser pulse for irradiating a first portion of the region with a second dose of laser energy in a manner that causes the first portion of the region irradiated with the second dose of laser energy to be in a different state than a second portion of the region that is not irradiated by the second dose of laser energy.

In another embodiment, a method of recording information on an optical disc includes heating a region of the optical disc with a first dose of laser energy. A first portion of the region is heated with a second dose of laser energy in a manner that causes the first portion of the region irradiated with the second dose of laser energy to be in a different state than a second portion of the region that is not heated by the second dose of laser energy.

In another embodiment, a method of recording data on a phase change optical disc includes melting a region of phase change material and directing energy to a first portion of the region so that the first portion of the region becomes crystalline. The size of the first portion determines the data written to the region.

In another embodiment, a method of recording data on a phase change optical disc includes causing an amorphous mark to be formed within a region of the optical disc wherein the size of the amorphous mark within the region determines the data stored in the region.

In another embodiment, a method of recording data on a phase change optical disc includes irradiating a region of the optical disc with a first pulse of laser energy having a first pulse rising edge and a first pulse falling edge and irradiating a first portion of the region with a second pulse of laser energy having a second pulse rising edge and a second pulse falling edge. The first pulse falling edge causes a transition from crystalline material to amorphous material and the second pulse rising edge causes a transition from amorphous material to crystalline material.

In another embodiment, a method of recording data on a phase change optical disc includes irradiating a region of the optical disc with a first laser beam having a first central intense beam portion and a first less intense annular beam portion and irradiating a first portion of the region with a second laser beam having a second central intense beam portion and a second less intense annular beam portion. The first less intense annular beam portion defines a first amorphous mark boundary and the second less intense annular beam portion defines a second amorphous mark boundary.

In another embodiment, a write strategy processor is configured to generate control signals for writing data to an optical disc. The write strategy processor includes processor configured to specify a first pulse of laser energy having a first pulse rising edge and a first pulse falling edge and a second pulse of laser energy having a second pulse rising edge and a second pulse falling edge. The first pulse falling edge causes a transition from crystalline material to amorphous material and the second pulse rising edge causes a transition from amorphous material to crystalline material.

In another embodiment, a method of recording data on an optical disc includes writing marks having a leading edge and a trailing edge wherein the leading and trailing edges of the marks are determined by different pulses of a writing laser and wherein the marks are smaller than the beam size of the writing laser.

In another embodiment, a method of recording data on a phase change optical disc having a layer of optical phase change material includes irradiating a region of the disc with a central intense beam portion that melts the optical phase change material and irradiating the region with a less intense annular beam portion that slows cooling of the region so that the melted optical phase change material is converted to a crystalline state.

In another embodiment, a method of writing an amorphous mark on a phase change optical disc includes irradiating a first region on the phase change optical disc with a first dose of energy. The first dose of energy is sufficient to substantially melt the first region on the phase change optical disc. A second region of the phase change optical disc is irradiated with a second dose of energy. The second dose of energy is sufficient to slow the cooling of a portion of the first region of the phase change optical disc so that the portion of the first region becomes crystalline.

In another embodiment, a method of storing information on an optical disc includes determining a data level to be stored in a region of an optical disc. The data level is one of a set of possible data levels that includes more than 2 levels.

A region of the optical disc is melted with a laser beam and thermal energy is delivered to a first portion of the region so that the first portion of the region cools more slowly than the remainder of the region. The size of the first portion is selected to correspond to the determined data level.

In another embodiment, a method of storing information on an optical disc includes forming a crescent shaped mark. The size of the crescent shaped mark represents a level of data selected from a set of possible data levels having more than two possible data levels.

In another embodiment, a method of writing a multilevel mark on an optical disc having a layer of phase change material includes irradiating a region of the optical disc with radiation that is at least sufficient to melt the phase change material. The energy of the radiation is modulated according to a multilevel data signal that is to be stored in first region in a manner such that as the energy of the radiation is increased, the melted phase change material tends to form an increasingly large crystalline region.

In another embodiment, a method of writing a multilevel mark on an optical disc having a layer of phase change material includes generating a first energy pulse at a first time. The first energy pulse width is modulated according to a first multilevel data value that is to be stored. A second energy pulse is generated at a second time. The second time is a fixed time interval after the first time. The second energy pulse has a pulse width and a power wherein the pulse width is modulated according to a second multilevel data value that is to be stored.

In another embodiment, a method of writing a multilevel mark on an optical disc having a layer of phase change material includes generating a series of pulses. Each pulse has a rising edge and a trailing edge. Each rising edge occurs periodically and each rising edge causes an amorphous to crystalline transition on a phase change optical disc. Each trailing edge causes a crystalline to amorphous transition on a phase change optical disc so that each amorphous to crystalline transition occurs periodically.

In another embodiment, a method of writing a multilevel mark on an optical disc having a layer of phase change material includes generating a series of pulses. Each pulse has a rising edge and a trailing edge and each rising edge causes an amorphous to crystalline transition on a phase change optical disc. Each trailing edge causes a crystalline to amorphous transition on a phase change optical disc. The centers of each pulse occur periodically so that amorphous regions are formed having centers that occur periodically.

In another embodiment, a method of writing a multilevel mark on an optical disc having a layer of phase change material includes generating a first energy pulse during a first time interval. The first energy pulse has a pulse width and a power. The pulse width is modulated according to a first multilevel data value that is to be stored and the first energy pulse is centered in the first time interval. A second energy pulse is generated during a second time interval. The second energy pulse has a pulse width and a power and the pulse width is modulated according to a second multilevel data value that is to be stored and wherein the second energy pulse is centered in the second time interval.

In another embodiment, a method of recording information on a medium includes activating a recording head that interacts with an active zone of a recording medium in a manner such that a first portion of the active zone has a first property and a second portion of the active zone has a second property. The recording head is deactivated so that a first transition between the first property and the second property is created. The recording head is moved and then reactivated so that a second transition between the second property and the first property is created.

In another embodiment, a method of recording information on a phase change material includes irradiating a region of the phase change material so that at least a portion of the irradiated region is melted and controlling the final phase of the irradiated region by controlling its subsequent temperature profile by modulating the power of a laser beam.

In another embodiment, a method of recording information of a phase change material includes melting a region of the material and causing a first portion of the melted region to cool slowly and become crystalline. A second portion of the melted region cools rapidly and become amorphous. The relative sizes of the crystalline and amorphous regions determine the data written to the region.

These and other features and advantages of the present invention will be presented in more detail in the following detailed description and the accompanying figures which illustrate by way of example the principles of the invention.

DETAILED DESCRIPTION

Figure 1A:
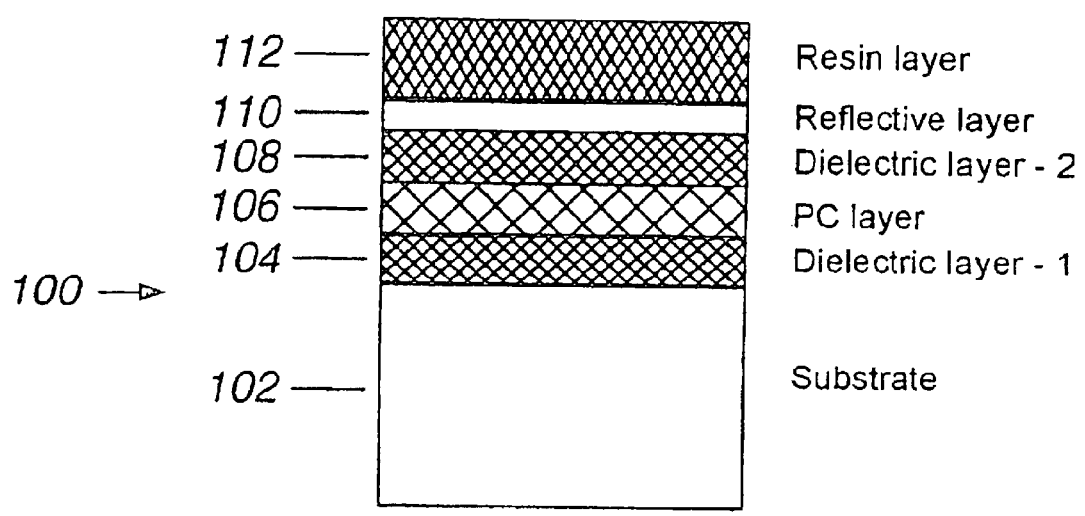
FIG. 1A is a cross section of a typical optical phase change disc.
Figure 1B:
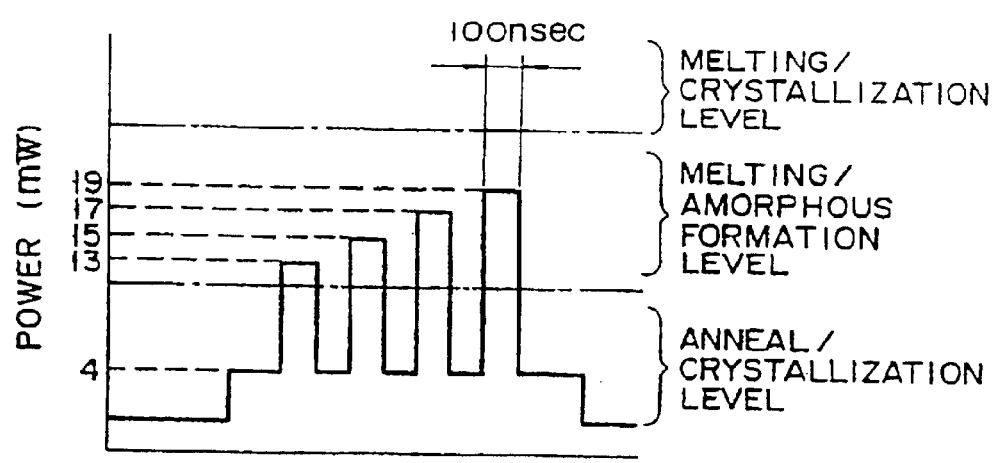
FIG. 1B illustrates the biasing signal disclosed in the Kobayashi patent as well as the different pulse signal levels for creating different amounts of amorphous material.
Figure 1C:
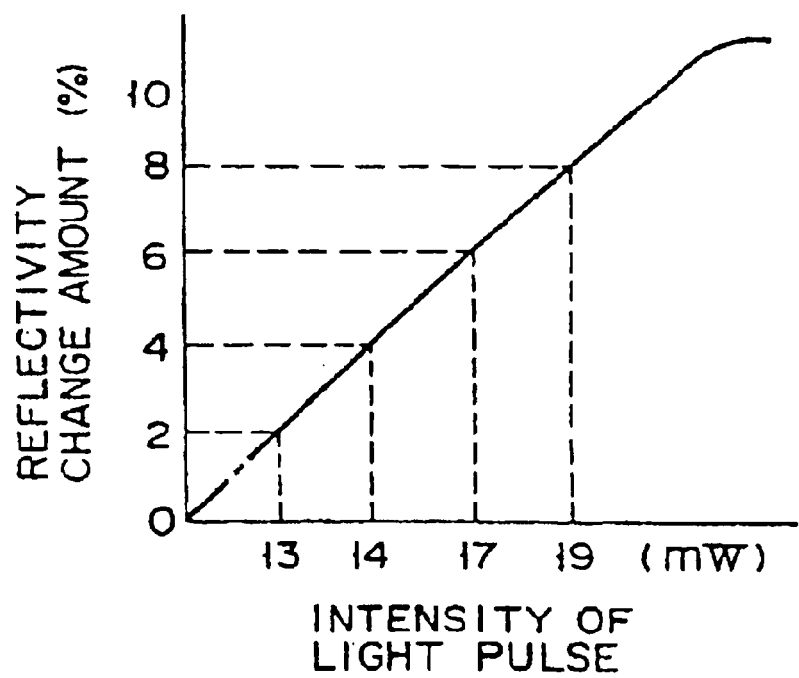
FIG. 1C illustrates the claimed results with reflectivity increasing as the amount of amorphous material formed increases.
Figure 1D:
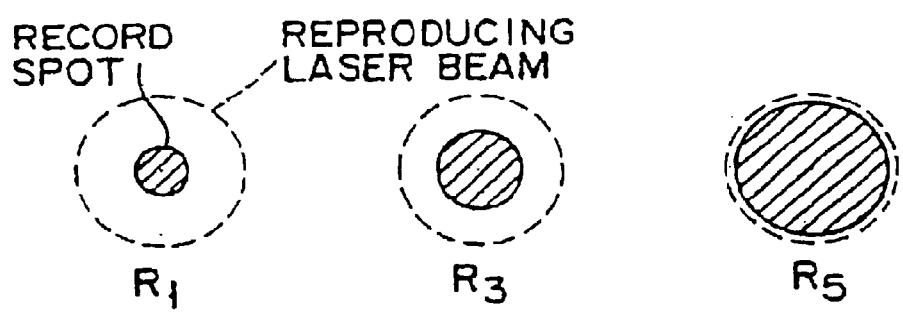
FIG. 1D illustrates the varying size of the written region.
Figure 1E:
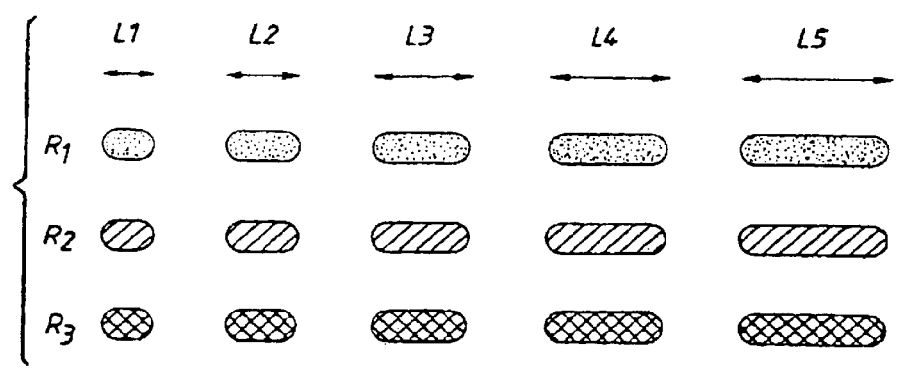
FIG. 1E illustrates different length marks having different reflectivities.
Figure 2:
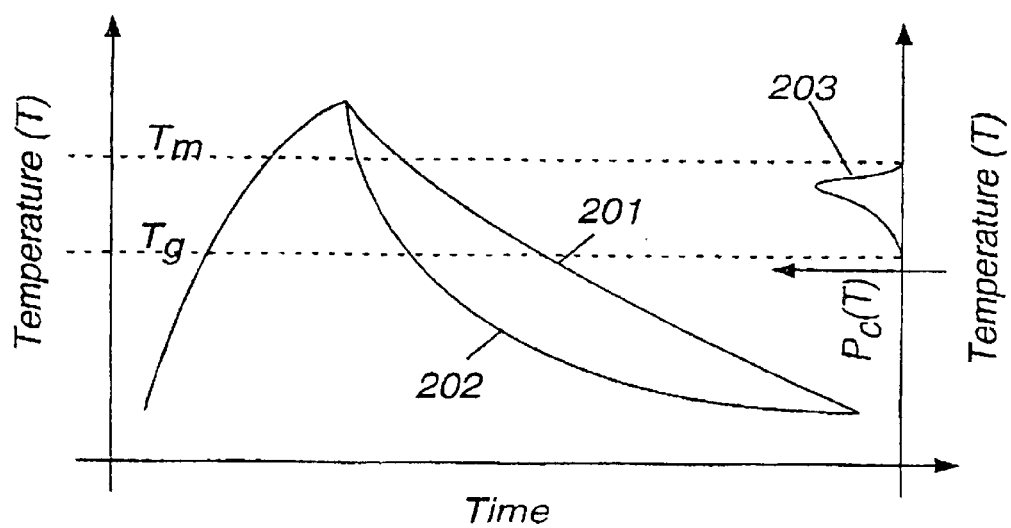
FIG. 2 is a graph illustrating how the final state of a phase change material may be varied by controlling the temperature of the material.

FIG. 2 is a graph illustrating how the final state of a phase change material may be varied by controlling the temperature of the material. When the phase change material is heated above temperature Tm, the material melts. In a region between Tm and Tg, the material tends to form a crystalline (C) structure. Below Tg, the material tends to form an amorphous (A) structure. Temperature profiles 201 and 202 illustrate ways of causing the phase change material to enter different states as it cools. If the material is heated and then cooled slowly as shown by profile 201, the material stays above Tg and below Tm for an extended period of time. As a result, crystalline material tends to form. If the material is heated and cooled quickly as shown by profile 202, then it spends little time between Tm and Tg. Amorphous material is formed as a result. Plot 203 shows in general the probability of crystalline material being formed as a function of temperature. Different size crystalline and amorphous regions with corresponding differences in reflectivity may be formed on an optical disc by irradiating the disc with laser energy and varying the amount and the timing of the laser energy applied to the disc so that the heating and cooling of the disc is controlled in a specific manner.

The heating and cooling of a region of phase change material is controlled by delivering doses of laser energy to the region. How the doses of energy affect the temperature of the phase change material over time is a function of the timing, the distribution, and the amount of laser energy deposited by the writing laser beam. The thermal properties of the phase change material including the properties of the substrate also affect how the doses of laser energy cause crystalline or amorphous regions of material to be formed.

In one embodiment, a writing laser beam having a beam profile with a central intense beam portion and a less intense annular portion surrounding the central beam portion is used to irradiate regions on the surface of an optical disc comprised of optical phase change material. It should be noted that the techniques disclosed herein are intended to be used with other types of phase change media and that the detailed description of an optical disc does not limit the application of the techniques to that media. However, the techniques are especially useful for solving the problem of increasing optical disc storage capacity. Typically, a laser beam will have a Gaussian beam profile that is more intense at the center of the beam and less intense at the edges. In the discussion that follows, for the purpose of example, it is assumed that the laser beam has circular symmetry. Other beam profiles may also be used to create particular mark shapes. In general, there is not a sharp definition between the central intense beam portion and the less intense annular portion of a Gaussian beam. However, common optical disc materials respond non-linearly to the resulting Gaussian-like temperature profile created by the laser. As a result, in some cases a sharp boundary may be formed between types of material. For example, some materials, melt above a temperature threshold Tm. Below a temperature Tg, the materials' state is not significantly changed. Between Tm and Tg, the formation of crystalline material is favored.

Figure 3A:
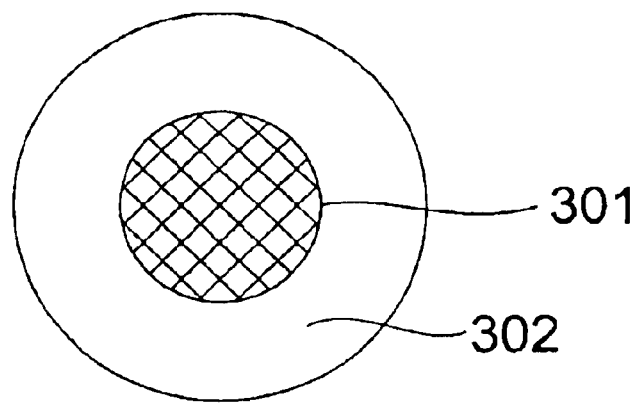
FIG. 3A is a diagram illustrating the effect of a writing laser pulse on a region of a rotating phase change disc.

FIG. 3A is a diagram illustrating the effect of a writing laser pulse on a region of a rotating phase change disc. As described above, the writing laser beam profile includes a intense central beam portion and a less intense annular beam portion. When the beam irradiates a portion of a disc, the central region tends to melt the phase change material. If the beam is then turned off, the melted material tends to cool quickly and form an amorphous region of material (as illustrated by region 301). If the beam is left on while the disc rotates so that the less intense annular region of the beam sweeps over the region previously irradiated by the central portion of the beam, the annular region tends to cause the material to spend more time in the temperature region between Tg and Tm. This results in a high probability of forming crystalline material in the annular region 302 regardless of the material's initial state.

Figure 3B:
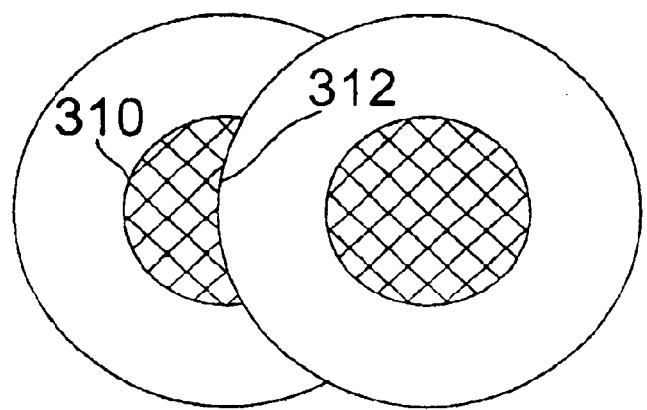
FIG. 3B illustrates the effect of a subsequent pulse that is timed so that its associated annular beam portion overlaps a region of material that was irradiated by the central beam portion of the previous pulse.
Figure 7A:
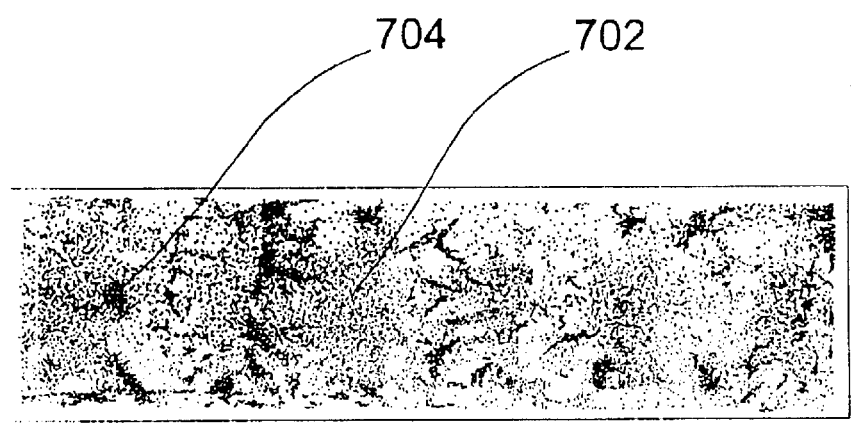
FIG. 7A illustrates marks made with left justified pulses as shown in FIG. 5A.

As the disc rotates further, the location of the beam center moves away from the center of region 301. FIG. 3B illustrates the effect of a subsequent pulse that is timed so that its associated annular beam portion overlaps a region of material that was irradiated by the central beam portion of the previous pulse. Without the annular less intense beam portion of the subsequent pulse irradiating a portion of the previously irradiated region, a circular amorphous region such as region 301 would be formed. Instead, the state of the material irradiated by the annular beam portion of a subsequent laser is changed to a crystalline state. Significantly, crystalline material is formed regardless of the initial state of the material. The result is a crescent shaped mark whose length along the line of beam travel may be controlled with great precision by varying the laser pulse duration and the time between subsequent pulses such as is shown in FIG. 7A).

In one embodiment, the less intense annular portion of the subsequent laser pulse causes a crystalline region to form because it slows the cooling of a melted region previously heated by the central intense beam portion of the previous laser pulse. In other embodiments, the crystalline annular region 302 may be formed by other mechanisms such as lateral diffusion of heat from the intensely irradiated region.

The crescent shaped amorphous mark includes a convex edge 310 that is defined by a crystalline to amorphous (C-A) transition. The position of convex edge 310 is primarily determined by the time of the falling edge of the first laser pulse. As long as the first laser pulse is on and the disc is rotating, the annular less intense beam portion of the first laser pulse is continually incident on regions of the disc previously illuminated by the central intense beam portion. The annular less intense beam portion causes such regions to become crystalline by increasing the time the material spends in the temperature region that favors the formation of crystalline material (see FIG. 2). When the laser pulse ends, the last region illuminated by the central intense beam portion is not later illuminated by the annular less intense beam portion and that region becomes amorphous. Thus, the position of the central intense beam portion when the laser pulse ends determines the C-A transition. It should be noted that exact location of the transition is shifted in different embodiments depending on the specific type of material used. While the position of the C-A transition is determined primarily by the time of the falling edge of the laser pulse, a sharp or gradual transition may be formed depending on whether the material response causes thresholding. .

In the description above, the laser pulse is described as "ending." In some embodiments, that means that the laser is turned off and power goes to zero. In other embodiments, the laser power is reduced to a biasing level of power. In other embodiments, the pulse ending means only that the laser power transtions to a different level. That is, the ending of one pulse may also be the beginning of another pulse at a different level of power.

The crescent shaped amorphous mark also includes a concave edge 312 that is defined by an amorphous to crystalline transition (A-C). The location of concave edge 312 is primarily determined by the time of the rising edge of the second laser pulse. Hence, the length of the amorphous crescent shaped mark is primarily determined by the time between the trailing edge of the first pulse and the leading edge of the second pulse. It should be noted that in some embodiments, marks that are crescent shaped as shown are formed. In other embodiments, material characteristics cause the shape of the marks to vary somewhat. In general, the falling edge of the first laser pulse in such embodiments determines a boundary between a region that tends to be more crystalline and a region that tends to be more amorphous. The rising edge of the next laser pulse determines a boundary between a region that tends to be more amorphous and a region that tends to be more crystalline.

Figure 7B:
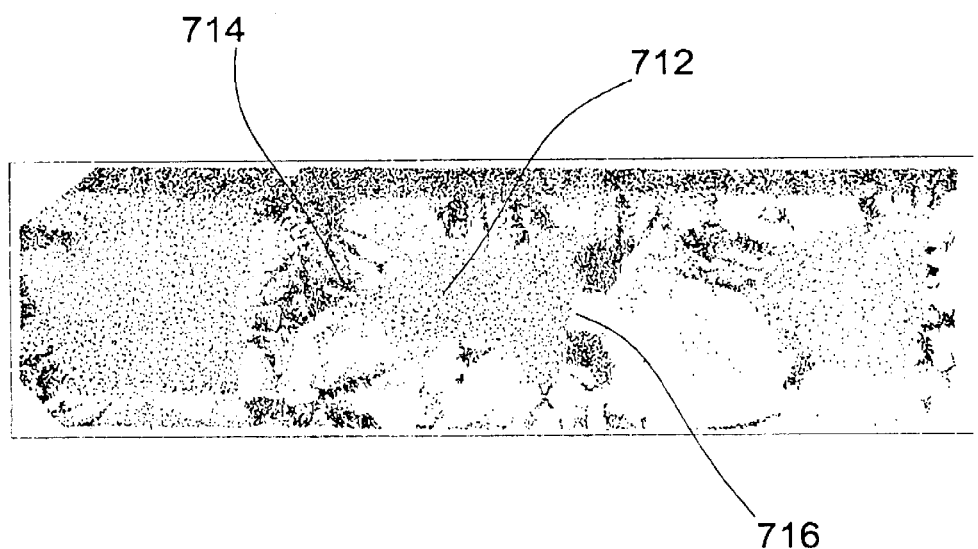
FIG. 7B illustrates marks written using variable power pulses P_g and widths Tau_g as shown in FIG. 5C.

In some embodiments, each pulse is of constant power. In other embodiments, the pulse power is varied while the pulse is on as illustrated in FIG. 5C. This variation of pulse power may result in mark shapes that differ from the crescent shape of FIG. 3B. FIG. 7B shows TEM images of typical marks made with the write strategy illustrated in FIG. 5C. As noted above, depending on the thermal properties of the phase change material and the disc substrate, the boundary between the amorphous and crystalline regions formed may be offset somewhat from the less intense annular portion and the central intense beam portion of the relevant laser pulses. Timing of the pulses may be adjusted to position marks in desired locations to compensate for such effects.

Other aspects of the recording process such as the geometry of a grooved substrate and thermal effects from neighboring marks may result in departures from the idealized crescent shape mark described above. For example, point 704 in FIG. 7A illustrates the influence of the groove geometry on the mark shape. The cusp near point 704 is primarily due to differences between the cooling rates of material in the groove center and material near the groove edge. Another departure from the idealized crescent shape may occur when neighboring data cells contain large amorphous regions. In such a condition a bridge may form connecting amorphous regions.

The length of the crescent-shaped mark may be smaller than the spot size of the writing laser. The reading laser in some embodiments has the same or nearly the same spot size as the writing laser. (In other embodiments the reading laser spot size is different from the spot size of the writing laser). The measured reflectivity of a region of a disc illuminated by a reading laser with a spot size that is larger than a mark in the region varies according to the relative size of the mark within the illuminated region. Since the mark size is precisely determined by the techniques described above, the measured reflectivity may be precisely controlled. By controlling mark size and varying the reflectivity of regions of the optical disc in this manner, data may be stored on the disc with very high density. As a result of this increased information density, the control of measured reflectivity achieved by this technique has advantages over other methods of writing data.

In this example and throughout this description, the crystalline and amorphous states are described as resulting from various sequences, types, and durations of laser radiation. Quaternary phase change materials such as used in commercially available CDRW discs are an example of materials that exhibit the described behavior. In some embodiments, different material states may be formed by the writing laser or the crystalline and amorphous states may be reversed. Furthermore, since the amorphous state of such materials generally has low reflectivity and the crystalline state generally has high reflectivity, amorphous regions are shown dark and crystalline regions are shown light. However, depending on the stack structure of the phase change disc, in some embodiments, the amorphous state may have a higher reflectivity than the crystalline state. For the purpose of clarity, the case where the amorphous state has a lower reflectivity and the crystalline state has a higher reflectivity is described in detail in this specific example. It should be noted that the other cases also fall within the scope of this invention.

In addition, it should also be noted that the writing techniques described herein may also be applied quite generally to materials other than phase change materials. The present invention may apply to any material that can be induced to be in two different states in the manner described above, whether or not those states are specifically crystalline and amorphous.

Figure 3C:
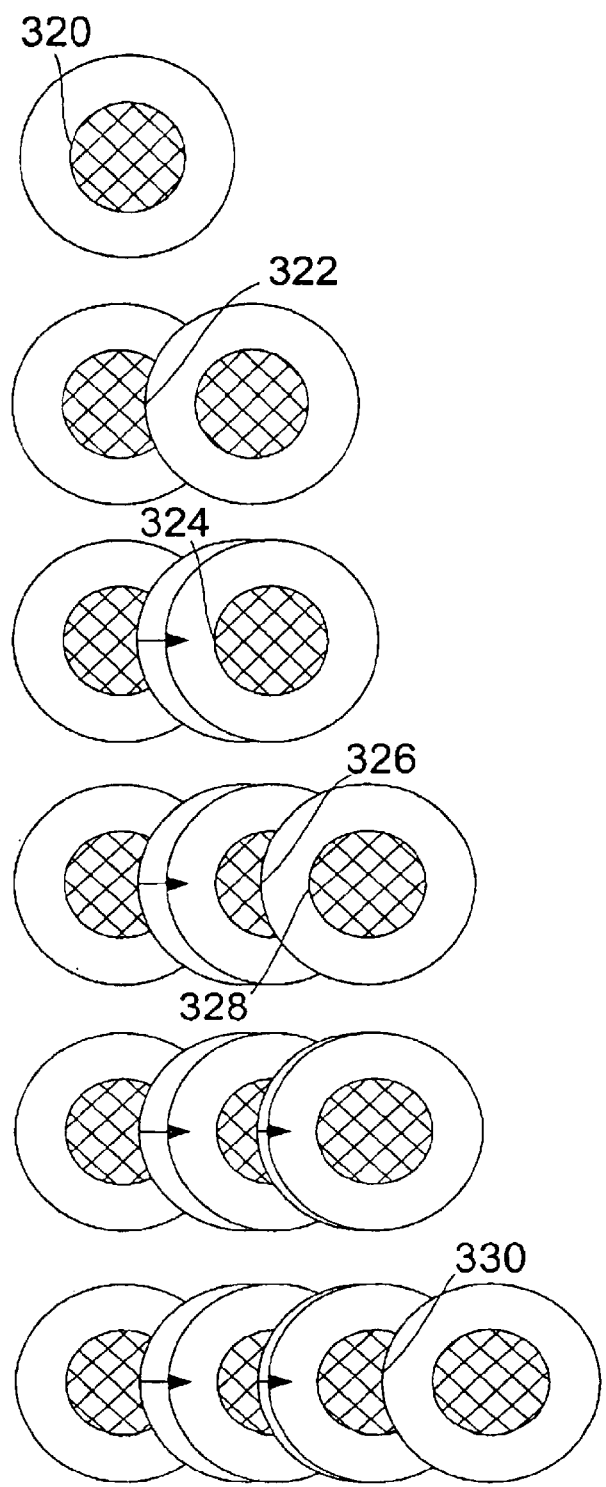
FIG. 3C is a diagram illustrating sequentially how successive crescent shaped marks are formed by a series of laser pulses.

FIG. 3C is a diagram illustrating sequentially how successive crescent shaped marks are formed by a series of laser pulses. A convex edge 320 of the first mark formed is defined by a C-A transition that results when a first laser pulse is turned off. After a time interval, a second laser pulse is turned on and concave edge 322 is formed for the first mark. Concave edge 322 is defined by an A-C transition that results from the annular beam portion of the second laser pulse overlapping the central beam portion of the first laser pulse. The second laser pulse remains on while the disc rotates, extending the crystalline region formed after edge 322. The second laser pulse is then turned off and the falling edge of the second laser pulse causes a convex edge 324 to be formed. In a similar manner, concave edge 326 is formed by the rising edge of a third laser pulse, convex edge 328 is formed by the falling edge of the third laser pulse and concave edge 330 is formed by the rising edge of a fourth laser pulse.

Significantly, the marks formed by this process are smaller than the diffraction limited size of the writing laser beam. The length of the crystalline region between amorphous marks is primarily determined by the time that each laser pulse is on. The length of each amorphous mark is primarily determined by the time interval between pulses. Because a subsequent pulse overwrites part of a mark formed by the previous pulse, the size of the remaining mark is less than the minimum size mark that could be formed by a single pulse, and may also be smaller than the reading laser beam.

Information may be encoded in the marks and read from the marks using different techniques. In one embodiment, a reading laser illuminates the marks and the intensity of the reflected signal from the disk is a function of the proportion of the illuminated region that is in an amorphous or crystalline state. The size of an amorphous mark formed in a region may thus control the overall reflectivity of that region when the region is illuminated by a reading laser. Because the reading laser beam is larger than the marks in a region, the intensity of the reflected light indicates the average reflectivity of the illuminated region. A small crescent shaped amorphous mark formed in a region reduces the reflectivity of the region by a small amount and a larger mark reduces the reflectivity of the region by a greater amount. The reflectivity may be used to encode a multilevel signal, having more than two possible levels or states. The ability to precisely control the size of the amorphous regions enables precise control of reflectivity so that a multilevel signal can be written and recovered from the disc. In another embodiment, information is stored in the marks based on the position of the mark edges.

Certain phase change materials are engineered so that the amorphous and crystalline phases of such materials have the same reflected intensties, but have different optical phases (or complex reflectivity values). In one embodiment, information may be encoded as differences in the complex reflectivity of a region of material. Different complex reflectivity values may result from either a pure optical phase difference or a combination of optical phase and reflected intensity differences.

Figure 5A:
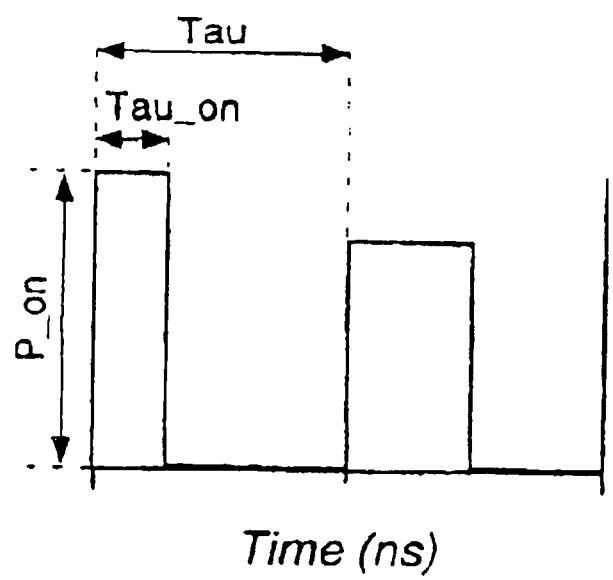
FIG. 5A illustrates a write strategy that is used in one embodiment to create marks for multi-level recording.

FIG. 5A illustrates a write strategy that is used in one embodiment to create marks for multi-level recording. Other write strategies that support the creation of multi-level signals are described below. Three parameters describe the write strategy shown in FIG. 5A: Tau, Tau_on, and P_on. Tau determines the period between pulses and is defined as the time between the rising edge of each pulse. Tau_on determines the width of each pulse and P_on determines the power of each pulse.

As described above, the rising edge of each pulse causes an A-C transition when the pulse is sufficiently close to the previous pulse. Each falling edge causes a C-A transition when the pulse is long enough to melt and crystallize material with the less intense annular portion of the beam. In one embodiment, the recording material moves at a velocity V with respect to the writing laser beam and the parameter Tau is related to the multi-level data cell length L by: L=Tau*V and the parameter Tau_on defines the time that the laser beam with power P_on irradiates the disc.

In one embodiment, the reflectivity of the data cell is made to take on multiple reflectivity values by varying Tau_on while keeping Tau constant. Tau_on controls the size of mark written in the data cell. The size of the mark controls the overall reflectivity of the cell and the reflectivity of the cell encodes a multilevel data signal. The precise time course of the laser power during the pulse determines the mark geometry. In one embodiment, pulses of constant power are used. In other embodiments, variable power pulses are used.

In the example shown in FIG. 5A, the pulses are left justified within each data cell defined by Tau. As a result, the A-C transitions are periodic with the time between A-C transitions being determined by Tau. In other embodiments, such as the one shown in FIG. 5B, the pulses are centered. Pulses may also be placed arbitrarily in the data cell. FIG. 7A illustrates marks made with left justified pulses as shown in FIG. 5A. Each amorphous mark 702 ends with an A-C transition. The A-C transitions are periodic.

Figure 5B:
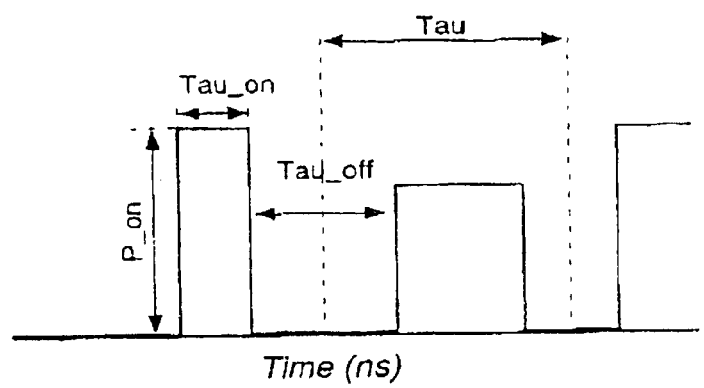
FIG. 5B illustrates a write strategy that is used in some embodiments to create marks for multi-level recording.
Figure 5C:
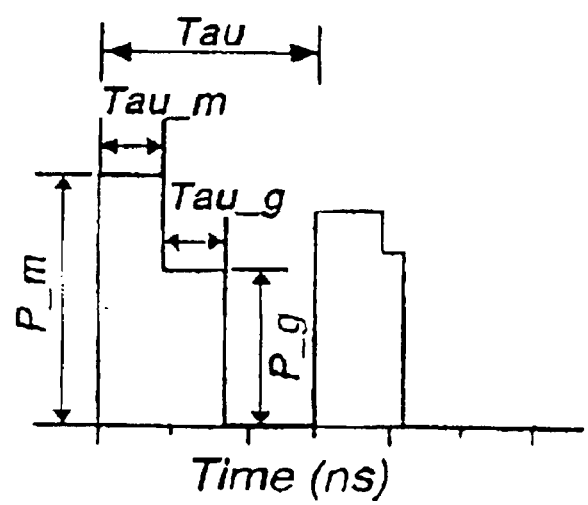
FIG. 5C is a diagram that illustrates a write strategy that uses a pulse having a variable power.

FIG. 5B illustrates a write strategy that is used in some embodiments to create marks for multi-level recording. As in FIG. 5A, three parameters describe the write strategy: Tau, Tau_off, and P_on. Tau_on for a particular pulse in FIG. 5B is algebraically related to Tau and Tau_off. Tau is defined as the time between the center of the interval between each pulse. Here, Tau is kept constant and determines the period between pulses or the length L of a data cell. Tau_off determines the width of the interval between pulses and P_on determines the power of each pulse. As Tau_off is varied for each interval, the timing of the rising and falling edges of each pulse are changed. The locations of the rising and falling edges determine the A-C and C-A transitions, respectively. So long as Tau_on causes some overlap between the central intense beam portion of one pulse and the less intense annular beam portion of the next pulse, decreasing Tau_off tends to decrease the size of each crescent shaped mark. In another embodiment, Tau is referenced to the time between the center of each pulse instead of the interval between pulses.

FIGS. 5A and 5B produce similar crescent-shaped amorphous spots, with different alignment within their respective data cells. With Tau kept constant and Tau_off varied appropriately, marks that are centered in data cells may be created. The write strategy of FIG. 5A produces A-C transitions which are periodic. As shown in FIG. 7A, the resulting amorphous spots are approximately right justified within periodic data cells. By contrast, the write strategy of FIG. 5B produces amorphous spots whose left and right edges are approximately centered within periodic data cells. Centering marks in the data cells tends to provide better signal contrast for certain modulation and coding schemes.

In other embodiments, Tau may be varied along with P_on to create variable length marks. Such marks may be used, for example, to store a multilevel value using the length of a mark. Tau may be increased as the multilevel value being stored increases and P_on may be adjusted to prevent the formation of a C-A transition as Tau and Tau on are increased.

Thus, in different embodiments, Tau and Tau_on are configured to provide marks with periodic A-C transitions, periodic C-A transitions, periodic centered crystalline marks, periodic centered amorphous marks, or other arbitrary mark placements. The particular scheme chosen may vary with particular media, coding schemes, or system design.

FIG. 5C is a diagram that illustrates a write strategy that uses a pulse having a variable power. P_on is varied so that the shape of a mark within a cell is varied. An example of such a strategy is illustrated in FIG. 5C and the resulting marks are shown in FIG. 7B. The pulses are defined by five parameters: Tau, Tau_g, Tau_m, P_g and P_m. In the example shown, the pulse begins with maximum power P_m and continues for a duration Tau_m at maximum power. Then, the pulse transitions to an intermediate power level P_g for a time Tau_g. After interval Tau_g, the pulse ends. As with all of the described write strategies, when the pulse ends, the power may either be zero power or a biasing power. Varying the power during a pulse changes the shape of a mark written by the pulse. In one embodiment, lowering the power in the middle of a pulse decreases the size of the amorphous mark by promoting the growth of crystalline material beginning at the outside boundary of the mark.

FIG. 7B illustrates marks written using variable power pulses P_g and widths Tau_g as shown in FIG. 5C. Each amorphous mark 712 begins with a C-A transition 714 and ends with an A-C transition 716. The first part of the pulse shown in FIG. 5C (defined by P_m and Tau_m) forms a large melted area. Without the second portion of the pulse (the portion defined by the reduced power level P_g and Tau_g,), the data cell would cool quickly to a large amorphous mark with low reflectivity. The second part of the pulse with the reduced power level P_g promotes the growth of crystalline material beginning at the outside boundary of the molten area and causes the resulting amorphous mark to shrink in size. As in the discussion of the crescent mark formation of FIG. 3B using the write strategy of FIG. 5A, a subsequent pulse also modifies the previous mark by crystallizing a portion with the less intense annular region of the beam.

Figure 4:
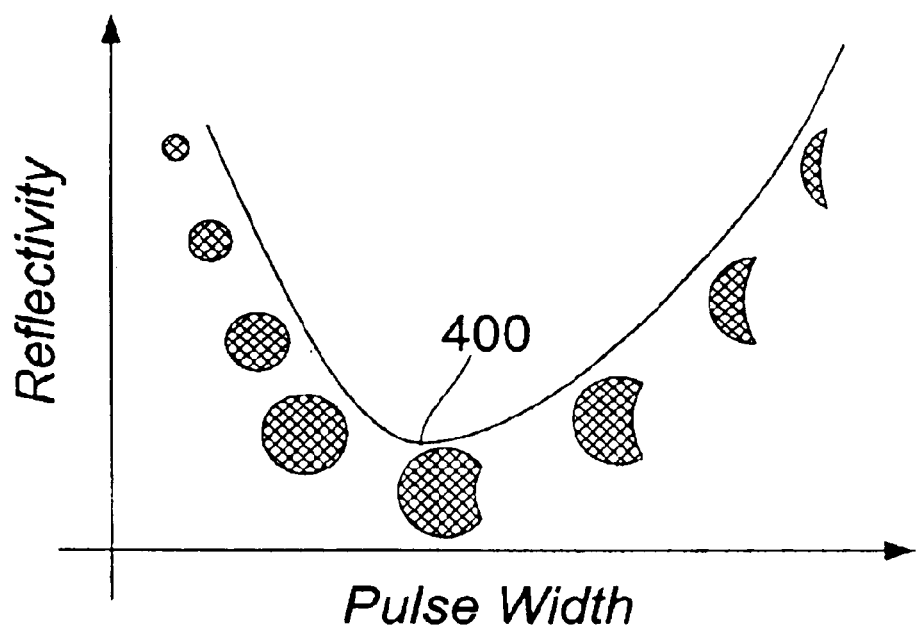
FIG. 4 is a graph illustrating how varying the size of crescent shaped amorphous marks can change the overall reflectivity of a region.

FIG. 4 is a graph illustrating how varying the size of crescent shaped amorphous marks can change the overall reflectivity of a region. In the example shown, the writing laser power is kept constant (e.g. 12 mW) for a series of identical pulses of the type shown in FIG. 5A and the time, Tau, between the beginning of each successive pulse is also kept constant. The marks shown are formed by successive pulses. Therefore, as the pulse width Tau_on is increased, the amount of energy incident on the disc increases, causing a larger and larger region of the disc to be melted and converted to the amorphous state. That effect dominates up to about point 400. The portion of the curve to the left of point 400 is referred to as the A side of the curve.

As the pulse width increases further, reflectivity begins to increase again as the effect from the neighboring pulses becomes significant. As the pulse width increases beyond the width required to create an amorphous region that corresponds to the size of the central intense beam portion of the writing laser, the annular less intense beam portion limits the size of the amorphous region by crystallizing material as the disc rotates. Because Tau is fixed, increasing the pulse width also decreases the time between successive pulses. Increasing the pulse width beyond about point 400 tends to cause subsequent pulses to crystallize portions exposed by previous pulses. The amorphous marks formed as a function of pulse width are depicted graphically beneath the plot of reflectivity in FIG. 4. The increasing size of the darkened circles up to point 400 represents the increasing amorphous spot size. After point 400, a crescent shaped amorphous region begins to form, causing the reflectivity to increase. Points to the right of point 400 are referred to as the B side of the curve. It should be noted that the circular shape of the regions shown before point 400 is intended to be exemplary and that in some embodiments, the region formed is actually oval shaped.

Using side B of the curve (to the right of point 400 in FIG. 4) for writing data has the significant advantage that data may be overwritten directly, without a separate prior erasing procedure. In general, melting makes the previous state of the material unimportant. As a result, data can be overwritten directly by melting the region of interest and precisely controlling its rate of cooling from the melted state in a manner that either favors the formation of crystalline material or favors the formation of amorphous material. Because of its simplicity, melting the material in the data track and precisely controlling its cooling has an advantage over the overwrite scheme described in the Kobayashi '573 patent. Kobayashi teaches providing a low constant bias power that anneals a crystalline region and then using pulses to form an amorphous region. Using the techniques described herein, the material need not be returned to a specific initial state. Since the material is melted, its initial state does not matter. In this manner, multiple reflectivity values can be directly recorded in the data cell, regardless of the data cell's previous state, by precisely controlling the amount of crystallization after melting.

Figure 6A:
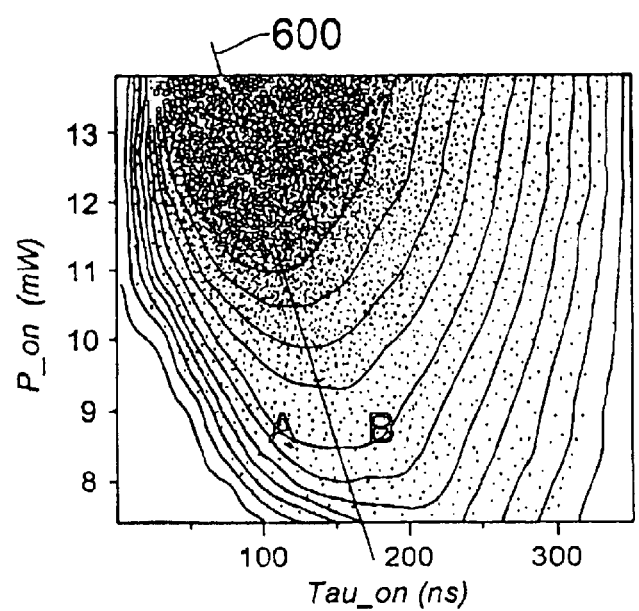
FIG. 6A is a contour plot illustrating the reflectivity of such a data cell as measured by a reading laser for various combinations of P_on and Tau_on.

As mentioned above, the reflected light from a typical reading laser represents an average reflectivity of the region illuminated by the reading laser. In the context of a fixed data cell size (constant Tau), different combinations of the pulse power (P_on) and the pulse length (Tau_on) generate different data cell reflectivities. FIG. 6A is a contour plot illustrating the reflectivity of such a data cell as measured by a reading laser for various combinations of P_on and Tau_on. Data may be written to an optical phase change disc by controlling reflectivity using a combination of the parameters P_on and Tau_on or by varying only one of the parameters. Similar to point 400 in FIG. 4, the line 600 in FIG. 6A divides the media behavior into two regimes referred to as side A and side B. Curves similar to FIG. 4 can be obtained by making a horizontal slice through the contour plot for a fixed power level P__on. On side A, increasing Tau__on tends to make a larger amorphous mark in the cell until about line 600. On side B, further increasing Tau__on tends to make a smaller amorphous mark in the cell.

For a typical phase change material where the initial crystalline state is more reflective than the amorphous state, either increasing the laser power or increasing the pulse duration in region A of FIG. 6A increases the amount of amorphous material formed. Thus, reflectivity decreases as the laser energy increases and more amorphous material is formed, as is shown on the A side of the curve. On side A, reflectivity of the irradiated portion of the disc decreases because the size of the region of the disc that is melted is increased. The curve reaches a minimum at points along the solid line 600 where further increasing the energy deposited on the disc does not further decrease reflectivity. The minimum reflectivity may be reached because the incident region may be completely melted at a certain energy so that increased energy no longer causes a larger amorphous region to be formed or because the size of the resulting amorphous mark is equal to or greater than the reading laser beam. Because there is little or no interference between adjacent laser pulses on side A of the curve, the size and location of each amorphous spot depends primarily upon the rising and falling edges of the same laser pulse.

On side B of the curves shown in FIG. 6A, another effect occurs that results in the creation of multiple data cell reflectivities. An initial pulse melts an area that would become a large amorphous mark in the phase change material without the effect of subsequent irradiation of the material. While the beam is turned off, the irradiated area of the disc moves away from the focal point of the beam. When a subsequent pulse begins and a portion of the previously created mark overlaps the less intense annular portion of the beam associated with the second pulse, the annular portion of the beam causes a portion of the previous mark to become crystalline.

The resulting crescent shaped mark represents a possible data level. In one embodiment, the size of the mark determines the average reflectivity of a data region that includes the crescent shaped mark. The remainder of the data region includes more or less crystalline reflective material depending on the size of the amorphous mark. As noted above, amorphous marks may be either crescent shaped or have some other shape depending on the writing waveform used. Even though the materials may behave in a binary fashion, a multi-level response is generated by reading marks of different sizes that are much smaller than the reading beam size. Multilevel recording and writing can thus be achieved in a material that exhibits a binary response by decreasing the size of marks written to the material. Multilevel data densities may be achieved with the precision, stability and repeatability associated with saturation recording techniques.

For a 780 nm IR laser and a 0.5 NA lens, the beam width is on the order of a micron. Minimum length marks written using the techniques described above are about an order of magnitude smaller. In contrast, conventional techniques have not successfully controlled mark geometry in a region that is smaller than the beam size of the laser that is transferring energy to the region.

There are various techniques for controlling the laser power. The laser power may be modulated or the laser may be pulsed with the pulse duration of the laser being varied, or both the pulse power and the pulse duration may be varied. The laser power may be modulated directly or by varying the amount of laser light that passes through a light modulator. Also, the time that the laser irradiates a portion of the disc may be varied by changing the rate of rotation of the disc.

In one embodiment, a fully programmable write laser control signal is generated using a multiplexer that selects inputs from different delay lines for the purpose of precisely adjusting the timing of write signal transitions derived from the multiplexer output. The delay lines may be obtained by using one or more delay lock loops referenced to an external clock to derive delay control voltages for delay cells. The delays produced by the delay cells are precisely defined fractions of the external clock period and are independent of fluctuation in temperature or power supply voltage. The derived delay voltages are input to delay stages to precisely generate delays for the input delay lines. The delay line corresponding to the exact desired delay can be selected by the multiplexer. It should be understood that other suitable methods of generating a laser write control signal may be used to generate write signals according to the strategies disclosed herein. The write strategies disclosed herein may be used with any available technique for generating the specified write signals.

When the amount of laser energy or dose of laser energy applied to a region is referred to, it should be understood that any of these methods or other alternative methods may be used to apply the desired amount and to vary the timing of the application of laser energy. In addition, it should be appreciated that different techniques may be appropriate for different phase change media types.

From FIG. 6A, specific values of Tau__on and P__on can be selected to maximize or minimize the measured reflectivity or produce any desired intermediate reflectivity value. In addition, separate contour plots that display other physical quantities of interest, such as the standard deviation of the measured reflectivity may be used to optimize the write strategy.

FIG. 6A is representative of a particular phase change material in which the initial crystalline state is more reflective than the amorphous state. While corresponding contour plots for other materials may look qualitatively different, it is possible to adapt the techniques described herein to optimize write strategies for a wide range of materials.

Thermal conduction of heat produced by a second laser pulse may affect a region irradiated by a first laser pulse in a similar manner as irradiation by a less intense annular beam portion of a second laser pulse. In some embodiments, a combination of thermal conduction and irradiation by a subsequent less intense annular beam portion determine each A-C transition. However, the A-C transition is still controlled by the rising edge of the subsequent laser pulse. In this case, the subsequent laser pulse that deposits a second dose of energy to a melted region to slow cooling need not be directly incident on a portion of the melted region. The beam could then have a uniform intensity cross section, although a cross section that includes an less intense annular beam portion and a central intense beam portion is presently preferred. The thermal energy transferred to the crystalline region by conduction tends to be less than the energy deposited on a region that is directly irradiated by the writing laser. In different embodiments, the second dose of energy applied to a melted region is transferred by indirect thermal conduction, by a less intense annular beam portion of a subsequent pulse, and by a combination of thermal conduction and a less intense annular beam portion of a subsequent pulse.

It should also be noted that when a first pulse and a second pulse are referred to, each of those pulses may include more than one power level as shown in FIG. 5C. Also, the first pulse may itself include a series of pulses in some embodiments that modulate the average power of the pulse. The relevant point in distinguishing the "first pulse" and the "second pulse" in such a case is that the first pulse or first dose of energy falling edge primarily determines a C-A transition. The transition occurs when the power from the writing laser beam is removed and the material cools rapidly resulting in the formation of primarily amorphous material.

The second pulse or second dose of energy rising edge creates the next A-C transition and its falling edge creates the next C-A transition. Intermediate power changes in the pulses (including periods of no power that may determine a duty cycle for the pulse) are considered to be part of the fine structure of the pulse.

Figure 6B:
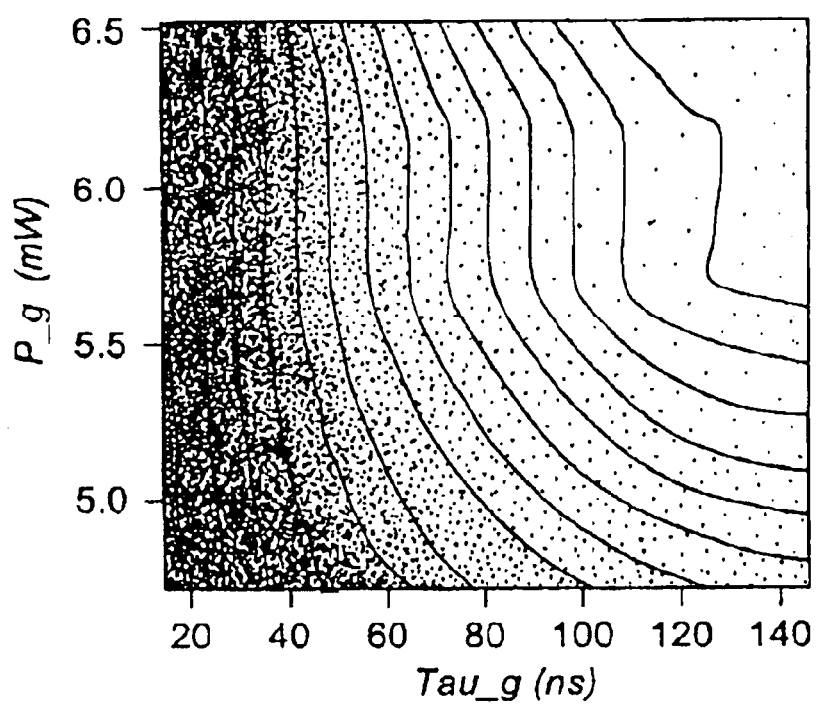
FIG. 6B is a contour plot illustrating the measured reflectivity of a data cell for various combinations of write strategy parameters P_g and Tau_g.

FIG. 6B is a contour plot illustrating the measured reflectivity of a data cell for various combinations of write strategy parameters P_g and Tau_g. These parameters describe the second part of the pulse of FIG. 5C. The first part of the pulse is fixed and described by the parameters P_m and Tau_m. In the context of a fixed data cell size (constant Tau), different combinations of the growth pulse power P_g of length Tau_g generate different data cell reflectivities. As FIG. 6B shows, the mechanism of mark formation for the write strategy of FIG. 5C is such that increasing either P_g or Tau_g increases the measured reflectivity. This is because the duration Tau_g of the growth pulse P_g decreases the size of the resulting amorphous mark by promoting the growth of crystalline material beginning at the outside boundary of the molten area formed by the first part of the pulse.

Figure 8:
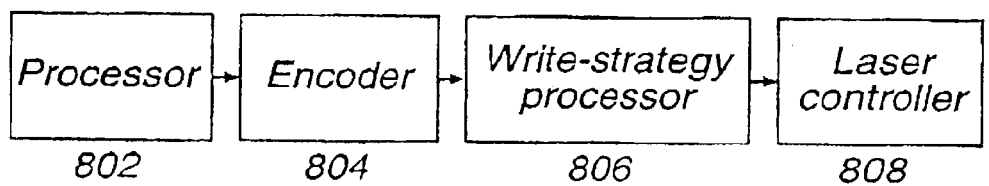
FIG. 8 is a block diagram of a disc writing system for implementing the write strategies described above.

FIG. 8 is a block diagram of a disc writing system for implementing the write strategies described above. A processor 802 generates or accesses data to be stored. An encoder 804 encodes the data. A write strategy processor 806 generates control signals for a laser controller 808. Write strategy processor 806 implements the method described above to specify waveforms to laser controller 808 for storing the data on the disc. Write strategy processor 806 may be implemented on a general microprocessor or on an application specific integrated circuit chip.

A high density recording method and apparatus for an optical disc has been described. In one embodiment, marks are written to an optical phase change disc using a writing laser that includes a central intense beam portion and a less intense annular beam portion. The techniques disclosed herein are applied to other types of media in different embodiments, including other types of phase change materials. The recording techniques described herein may generally be applied in any system having a recording head that interacts with an active zone of a recording medium in a manner such that different portions of the medium in the active zone have different properties after the interaction. As described herein, the recording head may be activated and deactivated while being moved relative to the medium. The activation and deactivations of the recording head create transitions between portions of the medium having different properties. The transitions may be closer together than the minimum size of an active area affected by the recording head at any given time. When the properties of the medium are detected, data encoded by the timing of the activation and deactivation of the recording head can be recovered.

In the embodiment described herein that uses a medium comprising an optical phase change material, the active zone of the medium is determined by the beam size of the writing laser and the transitions are between a crystalline and amorphous state. The crystalline and amorphous states are distinguishable by a reader because of their different reflectivities. The transitions between the states define marks. The marks written may be smaller than the size of the writing laser beam spot. The marks may also be smaller than the reading laser beam spot. In one embodiment, multilevel data signal is encoded by precisely controlling the reflectivity of a data cell that includes a mark by varying the size of the mark. The level written is recovered by precisely determining the overall reflectivity of the cell. In another embodiment, information is encoded by the lengths of the amorphous regions and the lengths of the crystalline regions. The edges between such regions are detected by a reader.

What is claimed is:

1. A method of recording information on an optical disc comprising:

irradiating a region of the optical disc with a first dose of laser energy;

irradiating a first portion of the region with a second dose of laser energy, wherein the second dose of laser energy causes the first portion of the region to be in a different state than a second portion of the region that is not irradiated by the second dose of laser energy.

2. The method of recording information on an optical disc according to claim 1, wherein:

said different state comprises a physical state of a material of said optical disc.

3. The method of recording information on an optical disc according to claim 1, wherein:

said second dose of laser energy causes the first portion of the region to have a different reflectivity than the second portion of the region.

4. A write strategy processor configured to generate control signals for writing data to an optical disc comprising a processor configured to specify (i) a first laser pulse for irradiating a region of the optical disc with a first dose of laser energy and (ii) a second laser pulse for irradiating a first portion of the region with a second dose of laser energy, wherein the second dose of laser energy causes the first portion of the region to be in a different state than a second portion of the region that is not irradiated by the second dose of laser energy.

5. The write strategy processor according to claim 4, wherein:

said processor is further configured to specify a maximum power level and an intermediate power level for each of said first laser pulse and said second laser pulse.

6. The write strategy processor according to claim 5, wherein:

said processor is further configured to specify a respective time interval for said maximum power level and said intermediate power level for each of said first laser pulse and said second laser pulse.

7. The write strategy processor according to claim 4, wherein:

said processor is configured to specify a first power level and first pulse width of said first laser pulse and a second power level and second pulse width for said second laser pulse.

8. A method of recording information on an optical disc comprising:

heating a region of the optical disc with a first dose of laser energy;

heating a first portion of the region with a second dose of laser energy, wherein heating the first portion with the second dose of laser energy causes the first portion of the region to be in a different state than a second portion of the region that is not heated by the second dose of laser energy.

9. The method of recording information on an optical disc according to claim 8, wherein:

said second dose of laser energy causes said first portion to cool according to a first temperature profile and said second portion to cool according to a second temperature profile.

10. The method of recording information on an optical disc according to claim 8, further comprising:

modulating power levels of said first dose of laser energy and said second dose of laser energy either (i) directly or (ii) by varying the amount of laser light that passes through a light modulator.

11. A method of recording data on a phase change optical disc comprising:

melting a region of phase change material; and directing energy to a first portion of the region so that the first portion of the region becomes crystalline, wherein the size of the first portion determines the data written to the region.

12. The method of recording data on a phase change optical disc according to claim 11, wherein:

a rising edge of said energy creates an amorphous to crystalline (A-C) transition and a falling edge of said energy creates a crystalline to amorphous (C-A) transition.

13. The method of recording data on a phase change optical disc according to claim 11, further comprising:

controlling a rate of rotation of said optical disc while said energy is directed to said first portion.

14. A method of writing a multilevel mark on an optical disc having a layer of phase change material comprising:

generating a first energy pulse during a first time interval, the first energy pulse having a first pulse width and a first power wherein the first pulse width is modulated according to a first multilevel data value that is to be stored and wherein the first energy pulse is centered in the first time interval; and generating a second energy pulse during a second time interval, the second energy pulse having a second pulse width and a second power wherein the second pulse width is modulated according to a second multilevel data value that is to be stored and wherein the second energy pulse is centered in the second time interval.

15. The method of writing a multilevel mark on an optical disc having a layer of phase change material according to claim 14, further comprising:

encoding said first and second multilevel data signals using a reflectivity characteristic of said optical disc.

16. The method of writing a multilevel mark on an optical disc having a layer of phase change material according to claim 15, further comprising:

controlling a size of an amorphous region to vary said reflectivity characteristic.

17. The method of recording information on a phase change material according to claim 15, further comprising:

controlling a position of an edge of an amorphous mark to encode said first and said second multilevel data signals.

18. A method of recording information on a phase change material comprising:

irradiating a region of the phase change material so that at least a portion of the irradiated region is melted; and controlling a final phase of the irradiated region by controlling a subsequent temperature profile of the irradiated region by modulating a power of a laser beam.

19. A method of recording information on a phase change material as recited in claim 18 wherein a portion of the irradiated region is melted twice.

20. The method of recording information on a phase change material as recited in claim 18, wherein:

said laser beam comprises a beam profile with central intense beam portion and a less intense annular portion surrounding said central beam portion.

21. The method of recording information on a phase change material as recited in claim 18, wherein:

said phase change material (i) melts when heated above a first predefined temperature, (ii) tends to form a crystalline structure when in a temperature range between said first predefined temperature and a second predefined temperature and (iii) tends to form an amorphous structure when below said second predefined temperature.

* * * * *